United States Patent
Jeon et al.

(10) Patent No.: US 11,620,819 B2
(45) Date of Patent: Apr. 4, 2023

(54) METHOD FOR SCHEDULING OF SHOOTING SATELLITE IMAGES BASED ON DEEP LEARNING

(71) Applicant: SI Analytics Co., Ltd, Daejeon (KR)

(72) Inventors: Taegyun Jeon, Daejeon (KR); Yeji Choi, Daejeon (KR)

(73) Assignee: SI ANALYTICS CO., LTD, Daejeon (KR)

(*) Notice: Subject to any disclaimer, the term of this patent is extended or adjusted under 35 U.S.C. 154(b) by 0 days.

(21) Appl. No.: 17/822,461

(22) Filed: Aug. 26, 2022

(65) Prior Publication Data
US 2023/0065519 A1    Mar. 2, 2023

(30) Foreign Application Priority Data
Aug. 27, 2021   (KR) .................... 10-2021-0113567

(51) Int. Cl.
| | | |
|---|---|---|
| *G06V 20/13* | (2022.01) | |
| *G06V 10/25* | (2022.01) | |
| *G06Q 10/1093* | (2023.01) | |
| *G06V 10/94* | (2022.01) | |
| *G06V 10/82* | (2022.01) | |

(52) U.S. Cl.
CPC ......... *G06V 20/13* (2022.01); *G06Q 10/1097* (2013.01); *G06V 10/25* (2022.01); *G06V 10/82* (2022.01); *G06V 10/945* (2022.01)

(58) Field of Classification Search
None
See application file for complete search history.

(56) References Cited

U.S. PATENT DOCUMENTS

| | | |
|---|---|---|
| 9,126,700 B2 | 9/2015 | Ozkul |
| 10,019,658 B2 | 7/2018 | Wang et al. |
| 10,262,403 B2 | 4/2019 | Kim et al. |
| 2012/0002981 A1 | 1/2012 | Park |
| 2012/0029812 A1 | 2/2012 | Altwaijry et al. |

FOREIGN PATENT DOCUMENTS

| | | |
|---|---|---|
| EP | 3478585 | 4/2020 |
| JP | 4020179 B2 | 12/2007 |
| KR | 10-1183105 B1 | 9/2012 |
| KR | 10-1647021 | 8/2016 |

(Continued)

OTHER PUBLICATIONS

Wang et al., "Online scheduling of image satellites based on neural networks and deep reinforcement learning", Chinese Journal of Aeronautics, vol. 32, Issue 4, pp. 1011-1019, 2019. (Year: 2019).*

*Primary Examiner* — Chan S Park
*Assistant Examiner* — Elisa M Rice
(74) *Attorney, Agent, or Firm* — Gottlieb, Rackman & Reisman, P.C.

(57) ABSTRACT

Disclosed is a method for scheduling of shooting of a satellite image based on deep learning, which is performed by a computing device. The method may include: generating a prediction image and a cloud amount prediction value up to a future time desired by a user based on a pre-shot satellite image by using a pre-trained neural network model; and determining a shooting schedule of a satellite for at least one region of interest based on the cloud amount prediction value.

13 Claims, 6 Drawing Sheets

(56) References Cited

FOREIGN PATENT DOCUMENTS

| KR | 10-1681178 B1 | 11/2016 |
| KR | 10-1855652 B1 | 5/2018 |
| KR | 10-1855652 B1 | 6/2018 |
| KR | 10-2005620 | 7/2019 |
| KR | 10-2021-0064672 | 6/2021 |

\* cited by examiner

METHOD FOR SCHEDULING OF SHOOTING SATELLITE IMAGES BASED ON DEEP LEARNING

CROSS-REFERENCE TO RELATED APPLICATIONS

This application claims priority to and the benefit of Korean Patent Application No. 10-2021-0113567 filed in the Korean Intellectual Property Office on Aug. 27, 2021, the entire contents of which are incorporated herein by reference.

TECHNICAL FIELD

The present disclosure relates to a method for automating a shooting schedule of satellite images, and more particularly, to a method for adjusting a shooting schedule of a satellite by reflecting a cloud amount prediction result based on deep learning.

BACKGROUND ART

It is important to obtain high-quality satellite images in order to accurately analyze a state of a shooting area, an accident which occurs in the shooting area, etc. through the satellite images. One of the important factors which influence the quality of the satellite image is cloud. When the ground is hidden by the cloud, the ground cannot be accurately shot by the satellite image. Therefore, it is necessary to obtain the satellite image by shooting the ground at the time when the influence of the cloud is minimized.

Meanwhile, since a satellite performs shooting while flying an orbit of the earth at a constant speed, the satellite image should be shot at the time when the satellite enters the sky of a point which a user desires to shoot. Therefore, in order to shoot the desired point through the satellite, it is necessary to control and manage a shooting schedule of the satellite image. A person directly determines a shooting time, and then adjusts the shooting schedule of the satellite by using reanalysis data at an interval of 3 hours produced by the Environmental Prediction Organization in the related art. However, in such a scheme, since the person should directly perform data analysis, a lot of time and cost required for analysis are required, so such a scheme cannot but be significantly inefficient.

Korean Patent Registration No. 10-1647021 (Aug. 24, 2016) discloses techniques for searching satellite schedule and expressing satellite orbit.

SUMMARY OF THE INVENTION

The present disclosure has been made in an effort to provide a method for automatically adjusting a shooting schedule of a satellite by reflecting a cloud amount prediction result based on deep learning.

An exemplary embodiment of the present disclosure provides a method for scheduling of shooting of a satellite image based on deep learning, which is performed by a computing device including at least one processor. The method may include: generating a prediction image and a cloud amount prediction value up to a future time desired by a user based on a pre-shot satellite image by using a pre-trained neural network model; and determining a shooting schedule of a satellite for at least one region of interest based on the cloud amount prediction value.

In an alternative exemplary embodiment, the cloud amount prediction value may include at least one of a total cloud amount based on the prediction image, a cloud amount according to the type of cloud based on the prediction image, or prediction accuracy.

In an alternative exemplary embodiment, the neural network model may be pre-trained by receiving patches extracted from a global observation satellite image. In this case, the patches may include a reference area including the at least one region of interest.

In an alternative exemplary embodiment, the reference area may include at least one region of interest, but may be an area that covers a distance which the cloud moves for a predetermined time.

In an alternative exemplary embodiment, the generating of the prediction image and the cloud amount prediction value may include cropping the pre-shot satellite image to include the at least one region of interest based on a latitude/longitude of the at least one region of interest, generating the prediction image based on the cropped image by using the neural network model, and generating the cloud amount prediction value based on the prediction image by using the neural network model.

In an alternative exemplary embodiment, the generating of the prediction image and the cloud amount prediction value may include generating the prediction image and the cloud amount prediction value by inputting the pre-shot satellite image and weather data other than the satellite image into the neural network model.

In an alternative exemplary embodiment, the determining the shooting schedule of the satellite for the at least one region of interest may include determining the shooting schedule for the at least one region of interest by determining a future time when the cloud amount of the at least one region of interest is minimized based on the cloud amount prediction value.

In an alternative exemplary embodiment, the determining the shooting schedule of the satellite for the at least one region of interest may include, when there is a plurality of regions of interest, determining a shooting order for the plurality of regions of interest by determining a priority based on the cloud amount prediction value.

In an alternative exemplary embodiment, the priority may be determined based on at least one of a first condition regarding a region where the cloud amount determined based on the cloud amount prediction value is minimized, a second condition regarding a top priority shooting region set by a user, or a third condition according to a visit time of the satellite for the at least one region of interest.

In an alternative exemplary embodiment, the method may further include providing a user interface which outputs the prediction image, the cloud amount prediction value, and the shooting schedule.

In an alternative exemplary embodiment, the providing of the user interface may include providing a user interface which outputs an alarm for requesting review for the shooting schedule of the user, and adjusting the shooting schedule according to a response of the user corresponding to the alarm.

Another exemplary embodiment of the present disclosure provides a computer program stored in a computer-readable storage medium. The computer program may execute the following operations for performing shooting scheduling of a satellite image based on deep learning when the computer program is executed by one or more processors, and the operations may include: an operation of generating a prediction image and a cloud amount prediction value up to a future time desired by a user based on a pre-shot satellite image by using a pre-trained neural network model; and an operation of determining a shooting schedule of a satellite for at least one region of interest based on the cloud amount prediction value.

Still another exemplary embodiment of the present disclosure provides a computing device performing shooting scheduling of a satellite image based on deep learning. The device may include: a processor including at least one core; a memory including program codes executable in the processor; and a network unit, and the processor may generate a prediction image and a cloud amount prediction value up to a future time desired by a user based on a pre-shot satellite image by using a pre-trained neural network model, and determine a shooting schedule of a satellite for at least one region of interest based on the cloud amount prediction value.

Yet another exemplary embodiment of the present disclosure provides a user terminal providing a user interface. The user terminal may include: a processor including at least one core; a memory; a network unit receiving a user interface from a computing device; and an output unit providing a user interface. In this case, the user interface may output a prediction image and a cloud amount prediction value up to a future time desired by a user, which is generated by using a pre-trained neural network model based on a pre-shot satellite image, and a shooting schedule of a satellite for at least one region of interest based on the cloud amount prediction value.

According to an exemplary embodiment of the present disclosure, efficiency of shooting schedule adjustment can be expected by automatically determining a shooting schedule of a satellite by reflecting a cloud amount prediction result based on deep learning.

Effects which can be obtained in the present disclosure are not limited to the aforementioned effects and other unmentioned effects will be clearly understood by those skilled in the art from the following description.

DETAILED DESCRIPTION

Figure 1:
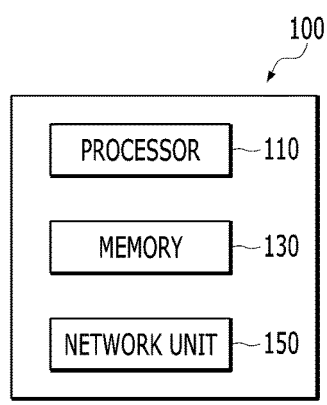
FIG. 1 is a block diagram of a computing device for performing shooting scheduling of satellite images according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system" and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, or "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

Descriptions of the presented exemplary embodiments are provided to enable a person skilled in the art to use or practice the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function, an artificial neural network, and a neural network may be interchangeably used.

Meanwhile, the term "image" or "video" used throughout the detailed description and claims of the present disclosure refers to multi-dimensional data constituted by discrete image elements (e.g., pixels in a 2D image), and in other words, refers to an object which may be seen with an eye (e.g., displayed on a video screen) or a digital representation of the object (such as a file corresponding to a pixel output).

FIG. 1 is a block diagram of a computing device for performing shooting scheduling of satellite images according to an exemplary embodiment of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an exemplary embodiment of the present disclosure. According to the exemplary embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network.

At least one of the CPU, GPGPU, and TPU of the processor 110 may process training of a network function. For example, the CPU and the GPGPU may process training of the network function and data classification by using a network function together. Further, in the exemplary embodiment of the present disclosure, the training of the network function and the data classification by using a network function may be processed by using the processors of the plurality of computing devices together. Further, the computer program executed in the computing device according to the exemplary embodiment of the present disclosure may be a CPU, GPGPU, or TPU executable program.

According to an exemplary embodiment of the present disclosure, the processor 110 may calculate a satellite image at a future time and a cloud amount prediction value corresponding to the satellite image at the future time based on a satellite image at a past time by using a pre-trained neural network model. For example, the processor 110 may generate a satellite image at a specific time of a future by inputting a stationary orbit satellite image during a predetermined period of a past into a neural network model. The stationary orbit satellite image as an image shot by a stationary orbit satellite covering a global area has an advantage of being capable of calculating a total cloud amount even for a region without a ground facility. Therefore, the processor 110 may generate the satellite image at the future time for minimizing a limitation of an observation area and effectively calculating the cloud amount by using the stationary orbit satellite image. Further, the processor 110 may generate information on cloud which is present in the satellite image based on the satellite image at a specific time of the future by using a neural network model. The information on the cloud may include a total cloud amount, an individual cloud amount according to the type of cloud, etc. which are present in the specific time of the future. Moreover, the processor 110 may calculate prediction accuracy indicating how much information on the cloud calculated through prediction of the neural network model is accurate. That is, the processor 110 calculates the prediction accuracy jointly with the information on the cloud to guarantee the reliability for the cloud amount prediction result at a specific future time.

Meanwhile, the processor 110 may also generate the satellite image and a cloud amount prediction value at the future time by inputting other weather data other than the satellite image into the pre-trained neural network model in addition to the satellite image at the past time. For example, the processor 110 may generate the satellite image at the specific time of the future by jointly inputting various weather data such as reanalysis data, ground observation data, etc., produced by the Environmental Prediction Organization into the neural network model in addition to a stationary orbit satellite image. Further, the processor 110 may calculate information on cloud which is present in the satellite image and the prediction accuracy of the cloud amount based on the satellite image at a specific time of the future by using the neural network model. That is, the processor 110 may perform more accurate cloud amount prediction than a case of using only the image by utilizing additional weather data other than the satellite image jointly.

The processor 110 may determine the shooting schedule of the satellite for a region of interest which a user desires to shoot by using the cloud amount prediction value calculated through the neural network model. The processor 110 may determine the cloud amount of the region of interest which the user desires to shoot by using the cloud amount prediction value calculated through the neural network model. The processor 110 may determine the shooting schedule of the region of interest which the user desires to shoot by considering a cloud amount determination result of the region of interest. For example, when the processor 110 intends to shoot the region of interest with a specific satellite (e.g., a high-resolution low-orbit satellite), the processor 110 may determine a shooting date and a shooting time of the specific satellite for the region of interest based on the cloud amount prediction value so as to obtain the high-quality satellite image for the region of interest. In this case, the processor 110 may determine a shooting date and a shooting time of the specific satellite for the region of interest based on a future time when the cloud amount is minimized. Further, the processor 110 may also determine the shooting date and the shooting time of the specific satellite by considering an earth orbit circulation schedule (i.e., a movement of the specific satellite) of the specific satellite jointly with the cloud amount prediction value. Since the cloud amount exerts a large influence on the quality of the satellite image to be analyzed, determining the shooting scheduling of the processor 110 allows the high-quality satellite image required for analysis to be efficiently obtained.

Meanwhile, when there is a plurality of regions of interest which the user desires to shoot, the processor 110 may adjust the shooting schedule of the satellite for the plurality of regions of interest as a whole by using the cloud amount prediction value calculated through the neural network model. The processor 110 may determine a shooting priority of the regions of interest by using the cloud amount prediction value calculated through the neural network model. The processor 110 may determine a shooting order of the regions of interest according to the shooting priority of the regions of interest. For example, when the number of regions of interest which the user desires to shoot is three, the processor 110 may determine the shooting priority of three regions of interest by using the cloud amount prediction value calculated based on the satellite image at the future time including three regions of interest. A region among three regions of interest in which the cloud amount is determined to be smallest based on the specific future time may be determined as a top priority shooting region. The processor 110 may determine the shooting priority of three regions of interest by considering all of shooting urgency of the region of interest, the movement of the satellite, etc., in addition to the cloud amount. When the shooting priority of three regions of interest is determined, the processor 110 may adjust the shooting schedule of the regions of interest according to the shooting priority of three regions interest. The shooting scheduling adjustment of the satellite for a plurality of regions of interest of the processor 110 may minimize time and cost required for organizing the shooting schedule.

The processor 110 may generate a user interface that outputs a prediction result and a scheduling task result generated through the neural network model. The processor 110 may generate a user interface that outputs a prediction image, the cloud amount prediction value, and the shooting schedule of the satellite for the region of interest generated through the neural network model. The processor 110 may visualize the cloud amount prediction result and the shooting schedule for the region of interest which the user desires to shoot through the user interface. Further, the processor 110 may perform an interaction with the user through the user interface. In this case, the interaction with the user may be appreciated as a process in which a data input of the user through a separate input unit provided in a user terminal or the computing device, and data processing and response of the processor 110 based on the data input of the user are performed. For example, the processor 110 may receive information on the region of interest, a visit time of the satellite for the region of interest, a future interest time, etc., from the user through the user interface. Further, the processor 110 may generate a user interface that outputs the cloud amount prediction result and the shooting schedule for the region of interest which the user desires to shoot, which are generated based on information received from the user.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use an arbitrary type known wired/wireless communication system.

The network unit 150 may receive a satellite image from an external system. For example, the network unit 150 may receive a satellite image acquired by shooting a ground from an artificial satellite system. The satellite image acquired by shooting the ground may be data for training the neural network model or data for inferring the neural network model. The satellite image may include all of an electro-optic image, a synthetic aperture radar (SAR) image, and the like shot through a stationary orbit artificial satellite, etc. The type of satellite image is not limited to the above-described example, but may be variously configured within a range to be understood by those skilled in the art.

The network unit 150 may transmit and receive information processed by the processor 110, information processed from the other terminal, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150.

The network unit 150 may transmit the information processed by the processor 110 and the information processed from the other terminal through direct communication with the satellite. For example, the network unit 150 may provide the shooting schedule generated by the processor 110 to a client (e.g., a high-resolution low-orbit satellite). Further, the network unit 150 may receive an external input of the user applied through the user terminal and transfer the external input to the satellite. In this case, the satellite itself may also process the information transferred through the network unit 150 and operate, the processor 110 may also transfer a control signal to the satellite through the network unit 150 to control a shooting operation of the satellite for a specific region of interest.

Although not illustrated in FIG. 1, the computing device 100 may also include an input unit and an output unit.

The input unit according to an alternative embodiment of the present disclosure may include keys and/or buttons on the user interface or physical keys and/or buttons for receiving the user input. A computer program for controlling a display according to embodiments of the present disclosure may be executed according to the user input through the input unit.

The input unit receives a signal by sensing a button operation or a touch input of the user or receives speech or a motion of the user through a camera or a microphone to convert the received signal, speech, or motion into an input signal. To this end, speech recognition technologies or motion recognition technologies may be used.

The input unit may also be implemented as external input equipment connected to the computing device 100. For example, the input equipment may be at least one of a touch pad, a touch pen, a keyboard, or a mouse for receiving the user input, but this is just an example and the present disclosure is not limited thereto.

The input unit may recognize a user touch input. The input unit according to an embodiment of the present disclosure may be the same component as the output unit. The input unit may be configured as a touch screen implemented to receive selection input of the user. The touch screen may adopt any one scheme of a contact type capacitive scheme, an infrared light detection scheme, a surface ultrasonic wave (SAW) scheme, a piezoelectric scheme, and a resistance film scheme. A detailed description of the touch screen is just an example according to an embodiment of the present disclosure and various touch screen panels may be adopted in the computing device 100. The input unit configured as the touch screen may include a touch sensor. The touch sensor may be configured to convert a change in pressure applied to a specific portion of the input unit or capacitance generated at the specific portion of the input unit into an electrical input signal. The touch sensor may be configured to detect touch pressure as well as a touched position and area. When there is a touch input for the touch sensor, a signal(s) corresponding to the touch input is(are) sent to a touch controller. The touch controller processes the signal(s) and thereafter, transmits data corresponding thereto to the processor 110. As a result, the processor 110 may recognize which area of the input unit is touched, and the like.

According to an alternative embodiment of the present disclosure, the output unit may output any type of information generated or determined by the processor 110 or any type of information received by the user interface and the network unit 150. For example, the output unit may include at least one of a liquid crystal display (LCD), a thin film transistor-liquid crystal display (TFT LCD), an organic light-emitting diode (OLED), a flexible display, and a 3D display. Some display modules among them may be configured as a transparent or light transmissive type to view the outside through the displays. This may be called a transparent display module and a representative example of the transparent display module includes a transparent OLED (TOLED), and the like.

Meanwhile, according to an exemplary embodiment of the present disclosure, the computing device 100 as a computing system that transmits and receives information to and from the client through communication may include a server. In this case, the client may be any type of terminal which may access the server. For example, the computing device 100 which is a server receives a ground shooting image from the artificial satellite system to predict the cloud amount of a specific region and determine the shooting schedule of the satellite. The computing device 100 which is the server may provide the user interface that outputs the cloud amount prediction result and the shooting schedule of the satellite to the user terminal. In this case, the user terminal may output the user interface received from the computing device 100 as the server, and receive and process the information through an interaction with the user.

The user terminal may display the user interface transferred from the computing device 100 which is the server. Although not separately illustrated, the user terminal may include a network unit receiving the user interface from the computing device 100, a processor including at least one core, a memory, an output unit providing the user interface, and an input unit receiving the external input applied from the user.

In an additional exemplary embodiment, the computing device 100 may also include any type of terminal that performs additional information processing by receiving a data resource generated in any server.

Figure 2:
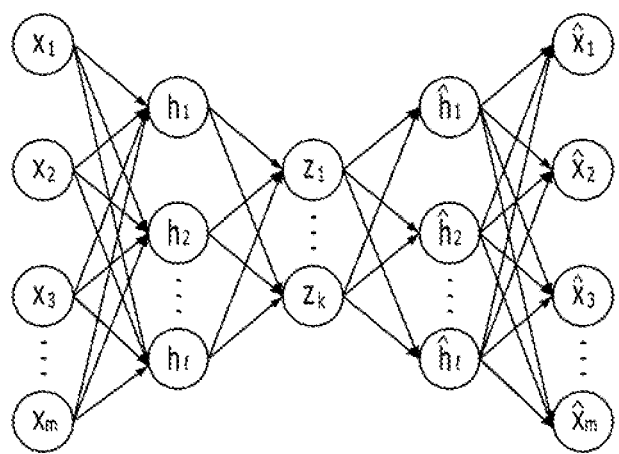
FIG. 2 is a conceptual view illustrating a neural network according to an exemplary embodiment of the present disclosure.

FIG. 2 is a conceptual view illustrating a neural network according to an exemplary embodiment of the present disclosure.

The neural network model according to an exemplary embodiment of the present disclosure may include a neural network for predicting the cloud amount which is present in an image based on the satellite image.

The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
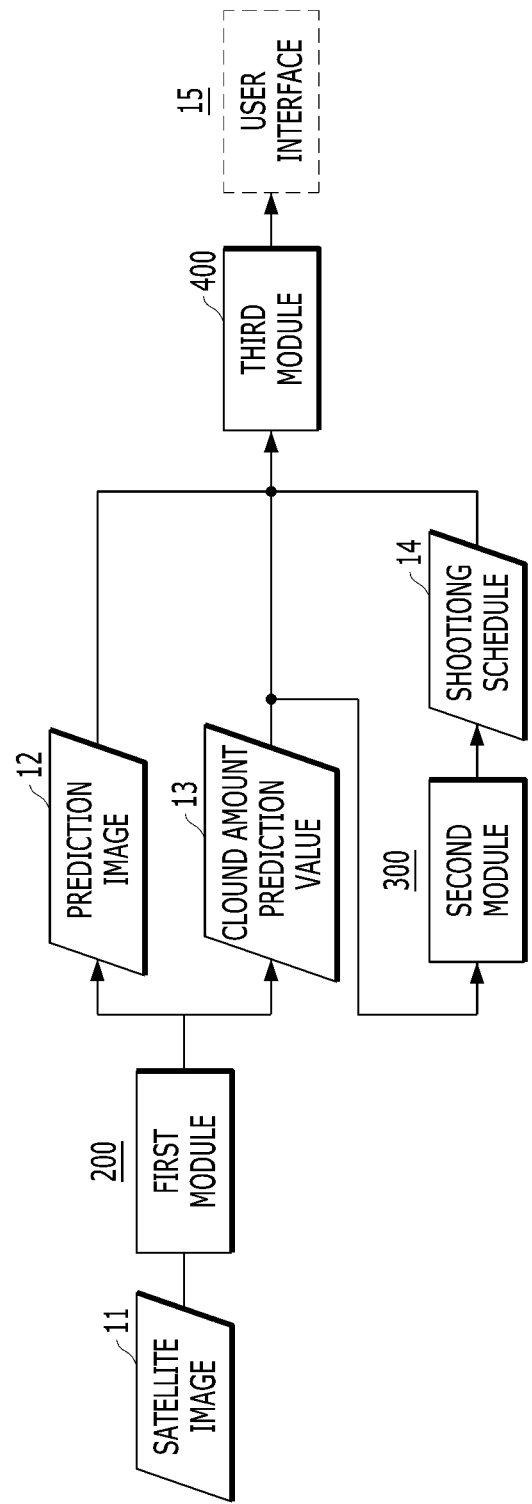
FIG. 3 is a block diagram illustrating a process of performing shooting scheduling of satellite images of a computing device according to an exemplary embodiment of the present disclosure.

FIG. 3 is a block diagram illustrating a process of performing shooting scheduling of satellite images of a computing device according to an exemplary embodiment of the present disclosure.

Referring to FIG. 3, the processor 110 of the computing device 100 according to an exemplary embodiment of the present disclosure may generate a cloud amount prediction result for a region which becomes a target of satellite shooting based on a satellite image 11 through a first module 200. The first module 200 may generate a prediction image 12 and a cloud amount prediction value 13 for a region which the user desires to shoot and a future time by inputting the satellite image 11 into the neural network model. The satellite image 11 as data at a past time based on a time when the neural network model performs prediction may also be data at a single time and also time-series data accumulated during a predetermined period. The prediction image 12 and the cloud amount prediction value 13 may also be data at the single time after the time when the satellite image 11 is shot, and may be time-series data accumulated up to the future time when the user desires shooting from a specific time after the time when the satellite image 11 is shot. For example, the first module 200 may generate the prediction image 12 and the cloud amount prediction value 13 based on a region of interest which the user desires to shoot and a satellite visit time in the region of interest by inputting the satellite image 11 accumulated during a predetermined period in the past into the neural network model. In this case, the region of interest which the user intends to shoot and the satellite visit time in the region of interest may be input into the processor 110 through a user interface 15 to be described below.

Specifically, the first module 200 may perform preprocessing for the satellite image 11 input into the neural network model. The preprocessing may be appreciated as a task of manipulating the satellite image 11 so that the pre-shot satellite image 11 includes at least one region of interest which the user desires to shoot. That is, so as to guarantee prediction performance by inputting high-quality information for a region of interest which becomes a prediction criterion of the neural network model into the neural network model, the first module 200 may extract an area including the region of interest from the existing shot time-series satellite image 11 and use the area as the input of the neural network model. For example, when the region of interest which the user intends to shoot and the satellite visit time in the region of interest are input through the user interface 15, the first module 200 crops a stationary orbit satellite image shot during a predetermined period in the past based on information on at least one region of interest to generate input data of the neural network model. The first module 200 may generate a crop image including at least one region of interest by preprocessing the pre-shot stationary orbit satellite image based on a latitude/longitude of at least one region of interest. When it is assumed that the number of regions of interest which the user desires to shoot is three, the first module 200 may determine an adjacent degree of three regions of interest based on the latitudes/longitudes of three regions of interest. The first module 200 may generate a crop image included in all of three regions of interest or generate individual crop images for three respective regions of interest according to the adjacent degree of three regions of interest.

The first module 200 may generate the prediction image 12 up to the future time desired by the user from a current time by inputting the crop image generated through the preprocessing into the neural network model. Here, the current time may be appreciated as a time when the crop image is input into the neural network model or a specific time selectable by the user. Further, the future time desired by the user may be appreciated as a specific time (however, after the current time) selectable by the user by considering the satellite visit time in the sky of the region of interest. That is, the first module 200 may generate the prediction image 12 at the future time for at least one region of interest based on the satellite image 11 preprocessed to include at least one region of interest by using the neural network model. In this case, the prediction image 12 may also be an image at a single time or also a time-series image showing a predetermined period of the future.

The first module 200 may generate the cloud amount prediction value 13 for at least one region of interest based on the prediction image 12 by using the neural network model. The first module 200 may calculate the cloud amount prediction value 13 for at least one region of interest included in the prediction image 12 by analyzing cloud which is present in the prediction image 12 by using the neural network model. In this case, the cloud amount prediction value 13 may include at least one of a total cloud amount based on the prediction image 12, a cloud amount according to a cloud type based on the prediction image 12, or prediction accuracy. For example, the first module 200 may calculate a total amount of all cloud which is present in the prediction image up to the future time desired by the user from the current time through the neural network model. Further, the first module 200 may calculate a cloud amount (a cirrocumulus amount, a cumulonimbus amount, an altostratus amount, etc.) for each type according to the type of cloud which is present in the prediction image through the neural network model. Moreover, the first module 200 may calculate prediction accuracy for evaluation for the prediction performance of the neural network model such as how well the prediction image shows a future time state, how accurately the amount of the cloud which is present in the prediction image is calculated, etc. When there is a plurality of regions of interest, the first module 200 may calculate the cloud amount prediction value 13 described in the above example for each region of interest in the prediction image 12. Further, the first module 200 may calculate the cloud amount prediction value 13 for each time according to the time of the prediction image 12.

The first module 200 may jointly utilize other weather data as the input data of the neural network model in addition to the satellite image 11 illustrated in FIG. 3. Here, other weather data may be appreciated as weather data which may assist cloud amount prediction, such as the reanalysis data produced by the Environmental Prediction Organization, the ground observation data, etc., except for the satellite image. When other weather data is utilized, the state of the cloud amount, a factor which influences a change in cloud amount, etc., which the neural network model may not determine in the satellite image may be determined more precisely and accurately. Therefore, in order to increase the cloud amount prediction performance of the neural network model, the first module 200 may additionally utilize other weather data in the satellite image 11 and use the other weather data as the input of the neural network model, and derive the prediction image 12 and the cloud amount prediction value 13.

Meanwhile, the neural network model used by the first module 200 may be pre-trained by receiving patches extracted from a global observation satellite image. In this case, the patches may include a reference area including at least one region of interest which the user desires to shoot. For example, the first module 200 may generate a learning data set by extracting the patches from the stationary orbit satellite image for training the neural network model that predicts the cloud amount. The patches constituting the learning data set may include the reference area. The reference area includes at least one region of interest, but may be an area that covers a distance which the cloud moves for a predetermined time. In this case, the predetermined time may depend on a time (or period) when the neural network model intends to predict. When the predetermined time is one day (i.e., when the period which the neural network model intends to predict is one day), the first module 200 may segment the stationary orbit satellite image by the unit of the patch, and define a wider area including the region of interest as a learning area by considering an area where the cloud moves for one day. The first module 200 may constitute the patches of the stationary orbit satellite image corresponding to the learning area as the learning data set and use the patches for training the neural network model.

Referring to FIG. 3, the processor 110 according to an exemplary embodiment of the present disclosure may generate a shooting schedule 14 of the satellite for a region which becomes a target of satellite shooting based on an output value of the first module 200 through the second module 300. The second module 300 may determine the shooting schedule of at least one region of interest based on the cloud amount prediction value 13 among the output values of the first module 200. For example, the second module 300 may determine the shooting schedule for at least one region of interest by determining the future time when the cloud amount of at least one region of interest is minimized based on the cloud amount prediction value 13. The cloud is an interruption factor which inhibits the quality of the satellite image. Therefore, the second module 300 determines the shooting schedule of the region of interest according to the time when the cloud amount is minimized to control the shooting schedule of the satellite so as to shoot the high-quality satellite image suitable for analysis.

When there is a plurality of regions of interest which the user intends to verify, the second module 300 determines the priority based on the cloud amount prediction value 13 to determine the shooting order for the plurality of regions of interest. The second module 300 may determine the shooting priority of the plurality of regions of interest according to the above-described conditions based on the cloud amount prediction value 13. The second module 300 may determine the shooting order of the plurality of regions of interest according to the shooting priority, and adjust the shooting schedule 14. In this case, the priority may be determined based on at least one of a first condition regarding a region where the cloud amount determined based on the cloud amount prediction value 13 is minimized, a second condition regarding a top-priority shooting region set by the user, or a third condition according to the visit time of the satellite in at least one region of interest. That is, the second module 300 may determine the priority for the shooting region at the future time desired by the user by complexly considering various conditions such as the cloud amount, urgency of the shooting, and the visit time of the satellite.

For example, in the case of regions of interest A, B, and C, the second module 300 determines the first condition according to the cloud amount prediction value 13 based on the specific future time input by the user to select region of interest A where the cloud amount is the smallest among three regions of interest as the top priority shooting region and generate the schedule. The second module 300 may select region of interest B or C as a next shooting region of region of interest A and generate the schedule by jointly considering the first condition according to the cloud amount prediction value 13, the second condition regarding the top priority shooting region set by the user, and the third condition representing the visit time of the satellite in the regions of interest B and C. In the above-described example, the second module 300 may preferentially determine the first condition, and then, determine the remaining conditions jointly, but individually consider the respective conditions and sequentially or comprehensively consider the respective conditions according to setting. That is, the determination of the conditions for determining the priority may be variously performed in a range transformable by those skilled in the art based on the above-described example.

The shooting scheduling through the second module 200 is performed by subjective determination of the person to effectively improve a problem of the existing satellite shooting scheduling scheme which is inaccurate and inefficient. That is, the computing device 100 according to an exemplary embodiment of the present disclosure automates a process of determining the shooting schedule of the satellite in a computing environment to minimize resources not required for shooting the satellite image and provide an environment which the user may efficiently manage the shooting schedule of the satellite. Further, the computing device 100 may provide an environment which may effectively control the motion of the satellite so as to shoot the satellite image suitable for analysis by reflecting the cloud amount prediction result through the neural network model to generation of the shooting schedule.

Referring to FIG. 3, the processor 110 according to an exemplary embodiment of the present disclosure may generate the user interface 15 for displaying the output values of the first module 200 and the second module 300 through the third module 400. The third module 400 may provide the user interface 15 that outputs the prediction image 12, the cloud amount prediction value 13, and the shooting schedule 14. The user interface 15 generated by the third module 400 may display data processed through the first module 200 and the second module 300, and provide an environment which allows the processor 110 to perform the interaction with the user. That is, the user may input external information such as a shooting region of interest, a satellite visit time, etc., into the processor 110 through the user interface 15. Further, the processor 110 may generate prediction information and scheduling information processed based on the external information input by the user, and provide the generated prediction information and scheduling information through the user interface 15. The user interface 15 generated through the third module 400 may also be provided to the user through an input/output unit directly provided in the computing device 100 or also transmitted to an external user terminal and provided to the user.

Meanwhile, a "scheduling review alarm" function which allows the user to modify (or adjust) the scheduling information processed through the processor 110 may be implemented through the user interface 15. When the second module 300 may not determine the priority according to the above-described conditions and individually determines schedules for the plurality of regions of interest, the scheduling review alarm function may be automatically implemented through the user interface 15. For example, when all of the cloud amounts of the plurality of regions of interest are similar, the priority determination according to the first condition is not made, and as a result, the schedules for the plurality of regions of interest may be individually determined. In this case, the processor 110 may provide the user interface 15 that outputs an alarm for requesting review for the shooting schedule of the plurality of regions of interest. That is, the processor 110 provides the user interface 15 to the user terminal to output the alarm and related information so as for the user to review the shooting order for the plurality of regions of interest. When receiving the input value from the user terminal through the user interface 15, the processor 110 may adjust the shooting schedule according to a response of the user corresponding to the alarm. That is, the processor 110 may determine the shooting order of the plurality of regions of interest according to the use response through the user interface 15. Through such a function, a scheduling case which is not normally determined by the processor may be effectively controlled by reflecting an intention of the user.

Figure 4:
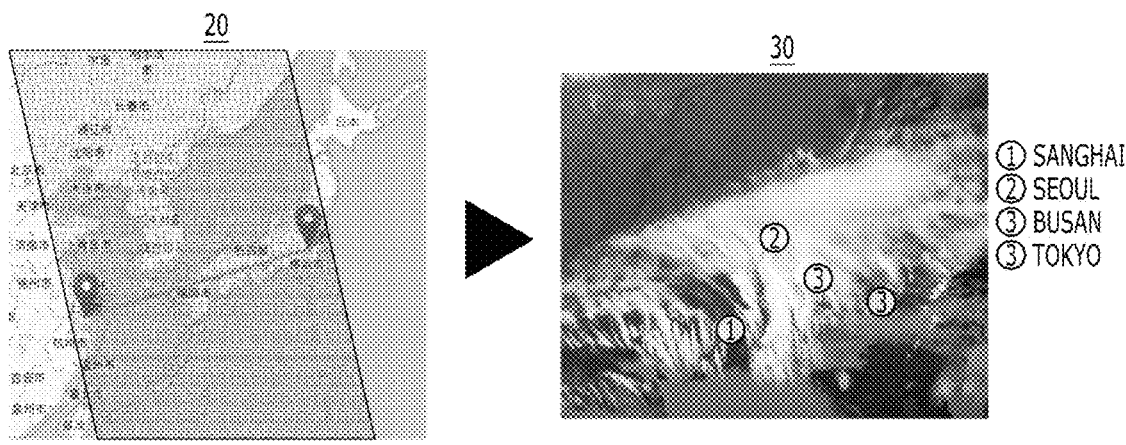
FIG. 4 is a conceptual view illustrating a user interface according to an exemplary embodiment of the present disclosure.

FIG. 4 is a conceptual view illustrating a user interface according to an exemplary embodiment of the present disclosure.

A shooting scheduling process of the satellite image according to an exemplary embodiment of the present disclosure may be started based on the input of the user through the user interface. First, the user interface may output the satellite image for receiving the input of the user. The user interface may receive information on the regions of interest which the user desires to shoot and the satellite visit time in the regions of interest according to the user input applied to the satellite image. The information input through the user interface may be transferred to and processed by the processor 110 of the computing device 100. The processor 110 may calculate the cloud amount prediction result of the regions of interest based on the information input through the user interface by using the neural network model. Further, the processor 110 may determine the satellite shooting schedule of the regions of interest based on the cloud amount prediction result of the regions of interest. The user interface may output the information processed through the processor 110.

For example, it is assumed that a box area is defined through a pin icon in the satellite image 20 of FIG. 4 by the user input through the user interface. Further, it is assumed that the region of interest is set to Seoul, Daejeon, Tokyo, and Shanghai in the box area, and a high-resolution low-orbit satellite is scheduled to pass through the sky of the box area including four regions of interest at a future time i. The processor 110 may generate cloud amount prediction information for four regions of interest based on the neural network model. In this case, the cloud amount prediction information as information periodically predicted based on the future time i may be the prediction image, the cloud amount for each region of interest, and the prediction accuracy. When the cloud amount of Seoul: 100%, the cloud amount of Busan: 50%, the cloud amount of Sanghai: 0%, and the cloud amount of Tokyo: 60% are predicted at the future time i and the cloud amount of Seoul: 0%, the cloud amount of Busan: 60%, the cloud amount of Sanghai: 100%, and the cloud amount of Tokyo: 50% are predicted at a future time i+1 (i+1 represents a next satellite visit time after i), the processor 110 may determine the shooting schedule and order by shooting Shanghai in which the cloud amount is minimized at the future time i and shooting Seoul in which the cloud amount is minimized at the future time i+1. The processor 110 may output a satellite image 30 representing the shooting schedule determined as (1) Shanghai and (2) Seoul jointly with the cloud amount prediction information through the user interface. (3) Busan and (4) Tokyo in which the cloud amounts are predicted to be similar at the future times i and i+1, are displayed in the satellite image 30 jointly with the review alarm and the order of (3) Busan and (4) Tokyo may be adjusted by the user, and the schedule may also be determined based on a result additionally predicted by the processor 110.

Figure 5:
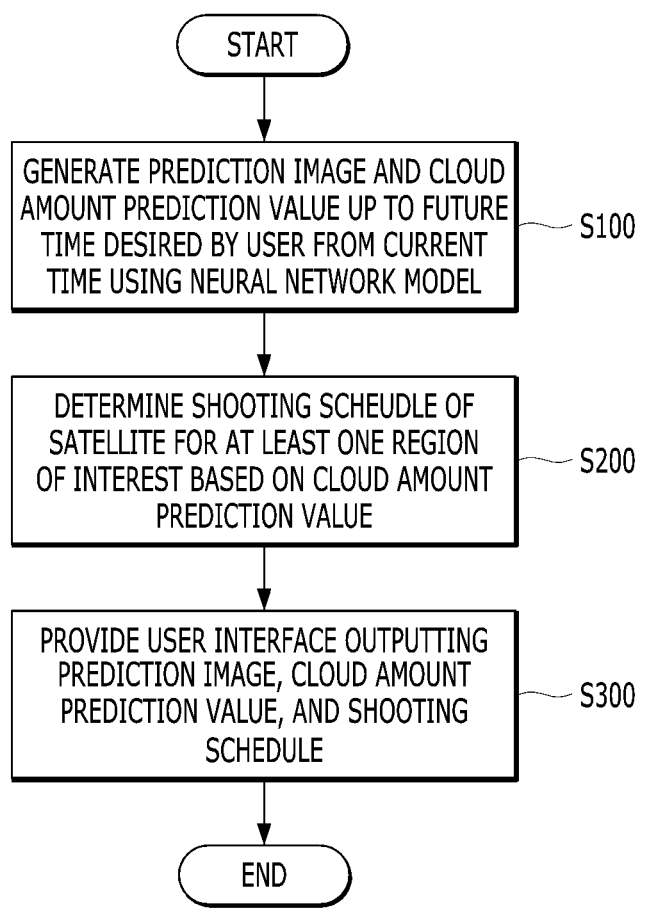
FIG. 5 is a flowchart illustrating a process of performing shooting scheduling of satellite images of a computing device according to an exemplary embodiment of the present disclosure.

FIG. 5 is a flowchart illustrating a process of performing shooting scheduling of satellite images of a computing device according to an exemplary embodiment of the present disclosure.

Referring to FIG. 5, in step S100, the computing device 100 may receive a pre-shot satellite image from the stationary orbit satellite system. The computing device 100 may generate the prediction image and the cloud amount prediction value during a predetermined period of the future based on the satellite image received from the stationary orbit satellite system by using the neural network model. In this case, the prediction image may be appreciated as a satellite image during a predetermined period of the future predicted from the stationary orbit satellite image during a predetermined period of the past input into the neural network mode. Further, the cloud amount prediction value as an analysis result of the prediction image may include the amount of the cloud which is present in the prediction image and the prediction accuracy which is the evaluation index for the prediction result. How much the prediction result of the neural network model may be reliable is evaluated through the prediction accuracy included in the cloud amount prediction value to efficiently train the neural network model.

In step S200, the computing device 100 may determine the shooting schedule of the satellite for at least one region of interest which the user desires to shoot based on the cloud amount prediction value calculated through the neural network model. The computing device 100 may basically determine the future time when the cloud amount is minimized based on the cloud amount prediction value as the shooting schedule of the region of interest. However, when there is the plurality of regions of interest, the shooting priority should be determined by comparing the regions of interests. Therefore, the computing device 100 may determine the shooting order of the regions of interest by comparing the cloud amount of the regions of interest based on a specific future time. For example, the computing device 100 may select a region of a clear sky without the cloud or a region of interest having a thin altostratus as the top priority shooting region based on the cloud amount prediction value. When the cloud amounts of the regions of interest may not satisfy two conditions above and are all similar, the computing device 100 may determine the shooting order of the regions of interest by comparing the cloud amounts based on a predetermined threshold (i.e., a limit permitted by the user). Meanwhile, since jointly considering other factors which influence the satellite shooting in addition to the cloud amount is required to determine the shooting schedule, the computing device 100 may also determine the shooting order of the regions of interest by comprehensively considering all of the shooting urgency of a specific region of interest, the satellite visit time, etc., in addition to the cloud amount prediction value. The computing device 100 may automatically tune the shooting schedule of the satellite image for the regions of interest through step S200, and effectively present an alternative to a region of which shooting is difficult due to the cloud.

In step S300, the computing device 100 may provide the user interface for visualizing the information calculated through step S100 and S200. The user interface may be generated in advance before step S100 in order to receive the user input. Various functions described in the following example may be implemented through the user interface. For example, when the user mentions specific data by a voice, a voice recognition function of visualizing the mentioned data may be implemented through the user interface. Further, a display function of selectively displaying the region desired by the user or selectively displaying the time-series image of each region of interest and an image for each time zone may be implemented through the user interface. The functions are just one example, and may be variously configured in a range changeable by those skilled in the art.

Figure 6:
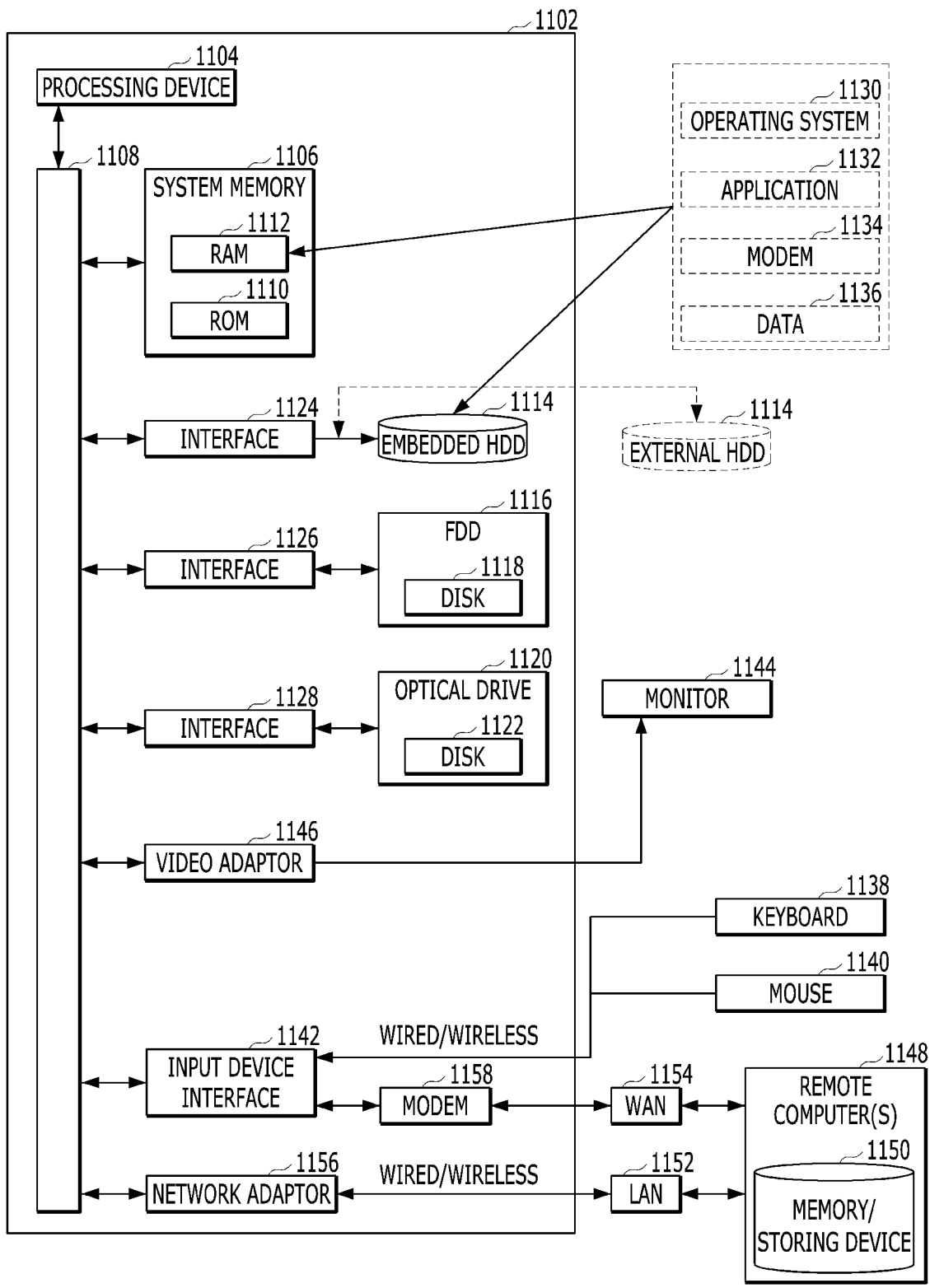
FIG. 6 is a schematic view of a computing environment according to an exemplary embodiment of the present disclosure.

FIG. 6 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless logical connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

According to the embodiment of the present disclosure, a computer readable medium storing a data structure is disclosed.

The data structure may mean organization, management, and storage of data that enables efficient access and correction of the data. The data structure may mean organization of the data for solving a specific problem (for example, data search, data storage, and data correction in the shortest time). The data structure may also be defined as a physical or logical relation between data elements designed so as to support a specific data processing function. The logical relation between the data elements may include a connection relation between the data elements considered by the user. The physical relation between the data elements may include an actual relation between the data elements physically stored in the computer readable storage medium (for example, a hard disk). The data structure may particularly include a set of data, a relation between data, and a function or a command applicable to data. The computing device may perform the computation by minimally using the resources of the computing device through the effectively designed data structure. Particularly, the computing device may improve efficiency of computation, reading, insertion, deletion, comparison, exchange, and search through the effectively designed data structure.

The data structure may be divided into a linear data structure and a nonlinear data structure according to the form of the data structure. The linear data structure may be a structure in which only one data is connected after one data. The linear data structure may include a list, a stack, a queue, and a deque. The list may mean a series of data sets that are internally ordered. The list may include a linked list. The linked list may be a data structure in which each data is connected in a line with a pointer. The pointer in the linked list may include link information with next or previous data.

The linked list may be expressed as a single linked list, a dual-linked list, a circular linked list according to the form. The stack may be a data listing structure limitedly accessible to data. The stack may be a linear data structure that may process (for example, insert or delete) data only at one end of the data structure. The data stored in the stack may be a data structure (Last in First Out (LIFO)), in which the later the data is stored, the faster the data comes out. The queue is a data listing structure limitedly accessible to data, and may be a data structure (First in First Out (FIFO)), in which the later the data is stored, the later the data comes out, unlike the stack. The deque may be a data structure that may process data at both ends of the data structure.

The nonlinear data structure may be the structure in which the plurality of data is connected after one data. The nonlinear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

The data structure may include a neural network. The data structure including the neural network may be stored in a computer readable medium. The data structure including the neural network may also include data input to the neural network, a weight of the neural network, a hyper parameter of the neural network, data obtained from the neural network, an active function associated with each node or layer of the neural network, and a loss function for training the neural network. The data structure including the neural network may include predetermined constituent elements among the disclosed configurations. That is, the data structure including the neural network may be formed of the entirety or a predetermined combination of data input to the neural network, a weight of the neural network, a hyper parameter of the neural network, data obtained from the neural network, an active function associated with each node or layer of the neural network, a loss function for training the neural network, and the like. In addition to the foregoing configurations, the data structure including the neural network may include other predetermined information determining a characteristic of the neural network. Further, the data structure may include any type of data used or generated in the computation process of the neural network, and is not limited to the foregoing matters. The computer readable medium may include a computer readable recording medium and/or a computer readable transmission medium. The neural network may be formed of a set of mutually connected calculation units which may be generally referred to as nodes. The nodes may also be referred to as neurons. The neural network includes one or more nodes.

The data structure may include data input to the neural network. The data structure including the data input to the neural network may be stored in the computer readable medium. The data input to the neural network may include training data input in the neural network training process and/or input data input to the neural network which is completely trained. The data input to the neural network may include preprocessed data and/or data to be preprocessed. The preprocessing may include a data processing process for inputting data to the neural network. Accordingly, the data structure may include the data to be processed and the data generated by the preprocessing. The foregoing data structure is merely an example, and the present disclosure is not limited thereto.

The data structure may include a weight of the neural network (in the present specification, the weight and the parameter may be used as the same meaning). Further, the data structure including the weight of the neural network may be stored in the compute readable medium. The neural network may include a plurality of weights. The weight may be variable, and in order for the neural network to perform a desired function, the weighted may be varied by a user or an algorithm. For example, when one or more input nodes are connected to one output node by links, respectively, the output node may determine an output node value based on the values input to the input nodes connected with the output node and a parameter set in the link corresponding to each of the input nodes. The foregoing data structure is merely an example, and the present disclosure is not limited thereto.

As a non-limited example, the weight may include a weight varied in a neural network training process and/or a weight when the neural network is completely trained. The weight varied in the neural network training process may include a weight at the start time of a training cycle and/or a weight varied during the training cycle. The weight when the neural network is completely trained may include a weight when the training cycle is completed. Accordingly, the data structure including the weight of the neural network may include a data structure including a weight varied in the neural network training process and/or a weight when the neural network is completely trained. Accordingly, it is determined that the weight and/or a combination of the respective weights are included in the data structure including the weight of the neural network. The foregoing data structure is merely an example, and the present disclosure is not limited thereto.

The data structure including the weight of the neural network may be stored in a computer readable storage medium (for example, a memory and a hard disk) after being subjected to a serialization process. The serialization may be the process of storing the data structure in the same or different computing device and converting the data structure into a form that may be reconstructed and used later. The computing device may serialize the data structure and transceive data through a network. The serialized data structure including the weight of the neural network may be reconstructed in the same computing device or the different computing device through deserialization. The data structure including the weight of the neural network is not limited to the serialization. Further, the data structure including the weight of the neural network may include a data structure (for example, B-Tree, Trie, m-way search tree, AVL tree, and Red-Black Tree in the nonlinear data structure) for improving efficiency of the computation while minimally using the resources of the computing device. The foregoing matter is merely an example, and the present disclosure is not limited thereto.

The data structure may include a hyper-parameter of the neural network. Further, the data structure including the hyper-parameter of the neural network may be stored in the computer readable medium. The hyper-parameter may be a variable varied by a user. The hyper-parameter may include, for example, a learning rate, a cost function, the number of times of the repetition of the training cycle, weight initialization (for example, setting of a range of a weight that is the target of the weight initialization), and the number of hidden units (for example, the number of hidden layers and the number of nodes of the hidden layer). The foregoing data structure is merely an example, and the present disclosure is not limited thereto.

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electromagnetic fields or particles, optical fields or particles, or a predetermined combination thereof.

Those skilled in the art will appreciate that the various illustrative logical blocks, modules, processors, means, circuits, and algorithm operations described in relation to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments will be apparent to those skilled in the art. General principles defined herein may be applied to other embodiments without departing from the scope of the present disclosure. Accordingly, the present disclosure is not limited to the embodiments suggested herein, and shall be interpreted within the broadest meaning range consistent to the principles and new characteristics suggested herein.

What is claimed is:

1. A method for scheduling of shooting of a satellite image based on deep learning, the method performed by a computing device including at least one processor, the method comprising:

generating a prediction image and a cloud amount prediction value up to a future time desired by a user based on a cropped image generated by cropping a pre-shot satellite image based on a latitude and longitude of at least one region of interest to include the region of interest by using a pre-trained neural network model; and determining a shooting schedule of a satellite for at least one region of interest based on the cloud amount prediction value.

2. The method of claim 1, wherein the cloud amount prediction value includes at least one of a total cloud amount based on the prediction image, a cloud amount according to the type of cloud based on the prediction image, or prediction accuracy.

3. The method of claim 1, wherein the neural network model is pre-trained by receiving patches extracted from a global observation satellite image, and the patches include a reference area including the at least one region of interest.

4. The method of claim 3, wherein the reference area includes at least one region of interest, but is an area that covers a distance which the cloud moves for a predetermined time.

5. The method of claim 1, wherein the generating of the prediction image and the cloud amount prediction value includes generating the prediction image and the cloud amount prediction value by inputting the pre-shot satellite image and weather data other than the satellite image into the neural network model.

6. The method of claim 1, wherein the determining the shooting schedule of the satellite for the at least one region of interest includes determining the shooting schedule for the at least one region of interest by determining a future time when the cloud amount of the at least one region of interest is minimized based on the cloud amount prediction value.

7. The method of claim 1, wherein the determining the shooting schedule of the satellite for the at least one region of interest includes when there is a plurality of regions of interest, determining a shooting order for the plurality of regions of interest by determining a priority based on the cloud amount prediction value.

8. The method of claim 7, wherein the priority is determined based on at least one of a first condition regarding a region where the cloud amount determined based on the cloud amount prediction value is minimized, a second condition regarding a top priority shooting region set by a user, or a third condition according to a visit time of the satellite for the at least one region of interest.

9. The method of claim 1, further comprising:

providing a user interface which outputs the prediction image, the cloud amount prediction value, and the shooting schedule.

10. The method of claim 9, wherein the providing of the user interface includes providing a user interface which outputs an alarm for requesting review for the shooting schedule of the user, and adjusting the shooting schedule according to a response of the user corresponding to the alarm.

11. A computer program stored in a non-transitory computer-readable storage medium, wherein the computer program executes the following operations for performing shooting scheduling of a satellite image based on deep learning when the computer program is executed by one or more processors, and the operations comprise:

an operation of generating a prediction image and a cloud amount prediction value up to a future time desired by a user based on a cropped image generated by cropping a pre-shot satellite image based on a latitude and longitude of at least one region of interest to include the region of interest by using a pre-trained neural network model; and an operation of determining a shooting schedule of a satellite for at least one region of interest based on the cloud amount prediction value.

12. A computing device performing shooting scheduling of a satellite image based on deep learning, comprising:

a processor including at least one core;

a memory including program codes executable in the processor; and a network unit, wherein the processor is configured to:

generate a prediction image and a cloud amount prediction value up to a future time desired by a user based on a cropped image generated by cropping a pre-shot satellite image based on a latitude and longitude of at least one region of interest to include the region of interest by using a pre-trained neural network model, and determine a shooting schedule of a satellite for at least one region of interest based on the cloud amount prediction value.

13. A user terminal comprising:

a processor including at least one core;

a memory;

a network unit receiving a user interface from a computing device; and a user interface unit, wherein the user interface unit is configured to:

generate a prediction image and a cloud amount prediction value up to a future time desired by a user based on a cropped image generated by cropping a pre-shot satellite image based on a latitude and longitude of at least one region of interest to include the region of interest by using a pre-trained neural network model, and determine a shooting schedule of a satellite for at least one region of interest based on the cloud amount prediction value.

* * * * *